United States Patent [19]

Hackhel

[11] 3,870,552

[45] Mar. 11, 1975

[54] PRESSURE-SENSITIVE ADHESIVE TAPE

[76] Inventor: Robert H. Hackhel, 414 Hickory, Lombard, Ill. 60148

[22] Filed: Jan. 31, 1974

[21] Appl. No.: 438,188

Related U.S. Application Data

[62] Division of Ser. No. 205,284, Dec. 6, 1971, Pat. No. 3,808,288.

[52] U.S. Cl.... 117/122 PF, 117/76 A, 117/122 PA, 117/122 P, 260/30.6 R, 260/30.8 R, 260/37 AL, 260/37 R, 260/823
[51] Int. Cl. ............................................... C09j 7/04
[58] Field of Search .... 117/122 P, 122 PF, 177 PA, 117/76 A, 68.5; 260/30.6 R, 30.8 R, 37 AL, 37 R, 823

[56]  References Cited
UNITED STATES PATENTS

| 2,699,431 | 1/1955 | Harvey | 260/828 |
| 3,118,851 | 1/1964 | Harvey | 260/828 |
| 3,310,504 | 5/1967 | Vandenberg | 260/823 |
| 3,660,323 | 5/1972 | Raguse | 117/122 X |
| 3,676,202 | 7/1972 | Korpman | 117/122 X |
| 3,778,306 | 12/1973 | Stow | 117/122 X |

Primary Examiner—William D. Martin
Assistant Examiner—Bernard D. Pianalto
Attorney, Agent, or Firm—Ellen P. Trevors

[57]  ABSTRACT

Pressure-sensitive adhesive tapes having solvent resistant adhesive coatings which consist essentially of an epihalohydrin polymer and a thermoplastic polyketone resin comprising the condensation product of an aliphatic ketone having a total of 3 to 6 carbon atoms; a monoaryl alkyl ketone having from 6 to 10 ring carbon atoms in the aryl group and from 1 to 4 carbon atoms in the alkyl group; an aliphatic ketone having a total of 3 to 6 carbon atoms with a lower aliphatic aldehyde; a monoaryl alkyl ketone having from 6 to 10 ring carbon atoms in the aryl group and from 1 to 4 carbon atoms in the alkyl group with a lower aliphatic aldehyde; or a carbocyclic ketone having 3 to 7 ring carbon atoms with a lower aliphatic aldehyde.

9 Claims, No Drawings

PRESSURE-SENSITIVE ADHESIVE TAPE

This is a division of application Ser. No. 205,284, filed Dec. 6, 1971, now U.S. Pat. No. 3,808,288.

This invention relates to pressure-sensitive, oil and aliphatic hydrocarbon solvent resistant adhesives and more particularly to pressure-sensitive adhesives containing an epihalohydrin polymer and a selected polyketone resin.

The development of a pressure-sensitive adhesive having a minimum number of components and good resistance to oil and aliphatic hydrocarbon solvents has been a long sought for objective of the pressure-sensitive tape industry. While such rubbers as chloroprene have some solvent resistant properties, they must be cured to achieve operable solvent resistance, but this property is realized at the expense of pressure sensitivity. Solvent resistant adhesives based on nitrile rubbers have also been disclosed, for example, in U.S. Pat. No. 2,601,016, but large amounts of plasticizer are required to produce an adhesive having sufficient tack. In addition to an economical and manufacturing disadvantage, the use of a plasticizer is unattractive in that such an additive is migratory and tends to weaken the cohesive strength of the adhesive.

Now it has been found in accordance with this invention that a pressure-sensitive adhesive having excellent oil and aliphatic solvent resistance can be formulated by blending:

a. an elastomeric epihalohydrin polymer comprising recurring units having the formula

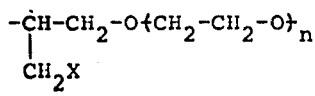

I wherein X is halogen, e.g., chlorine or bromine, and $n$ is zero to 2; and b. a thermoplastic polyketone resin comprising the condensation product of an aliphatic ketone having a total of 3 to 6 carbon atoms; a monoaryl alkyl ketone having from 6 to 10 ring carbon atoms in the aryl group and from 1 to 4 carbon atoms in the alkyl group; and aliphatic ketone having a total of 3 to 6 carbon atoms with a lower aliphatic aldehyde; a monoaryl alkyl ketone having from 6 to 10 ring carbon atoms in the aryl group and from 1 to 4 carbon atoms in the alkyl group with a lower aliphatic aldehyde; or a carbocyclic ketone having 3 to 7 ring carbon atoms with a lower aliphatic aldehyde; said thermoplastic polyketone resin being present in an amount from about 30 to about 150 parts per 100 parts of said epihalohydrin polymer.

Furthermore, the pressure-sensitive adhesive compositions of this invention do not require the use of a plasticizer, and thus are stable, easy to manufacture economical.

Exemplary epihalohydrin polymers a. suitable for use in the pressure-sensitive adhesive compositions disclosed herein are Hydrin 100 and Hydrin 200, products of the B. F. Goodrich Chemical Co. Hydrin 100 elastomer comprises units corresponding to formula I wherein X is chlorine and $n$ is O, and has a specific gravity of 1.36. Chlorine analysis has indicated that Hydrin 200 comprises units corresponding to formula I wherein X is chlorine and $n$ is about 1.4; it has a reported specific gravity of 1.27. However, the aforementioned epihalohydrin polymers are merely illustrative, and other polymers having the formula I can be suitably employed.

As previously mentioned, various thermoplastic polyketone resins are suitable for use in the compositions of this invention. Illustrative of the condensation products of aliphatic ketones having a total of 3 to 6 carbon atoms are the condensation products of acetone, methyl ethyl ketone, 3-hexanone, etc. Exemplary condensation products of monoaryl alkyl ketones having from 6 to 10 ring carbon atoms in the aryl group and from 1 to 4 carbon atoms in the alkyl group are acetophenone, propiophenone, butyrophenone, valerophenone, 1'-butyronaphthone, etc. Suitable for use are condensation products of the aforementioned aliphatic ketones and monoaryl alkyl ketones with lower aliphatic aldehydes; by the term "lower aliphatic aldehyde" in the claims and specification herein is meant an aldehyde having a total of 1 to 4 carbon atoms. Exemplificative of this class of thermoplastic polyketone resins are the condensation products of acetone and butyraldehyde, methyl ethyl ketone and formaldehyde, acetophenone and formaldehyde, 1'-butyronaphthone and formaldehyde. Typical of the condensation products of a carbocyclic ketone having 3 to 7 ring carbon atoms with a lower aliphatic aldehyde are the condensation products of cyclopropanone and butyraldehyde, cyclohexanone and formaldehyde, 2,5-cyclohexadien-1-one and formaldehyde, and cycloheptanone and formaldehyde. Mixtures of any of the aforementioned condensation products can also be employed.

While any of the previously described thermoplastic polyketone resins can be utilized in the practice of this invention, it is preferred to employ the condensation product of a phenyl alkyl ketone having 1 to 4 carbon atoms in the alkyl group; the condensation product of an aliphatic ketone having a total of 3 to 6 carbon atoms with a lower aliphatic aldehyde; the condensation product of a phenyl alkyl ketone having 1 to 4 carbon atoms in the alkyl group with a lower aliphatic aldehyde; or the condensation product of cyclohexanone with a lower aliphatic aldehyde.

Particularly preferred are the acetophenone resins. The term "acetophenone resin" as employed in the claims and specification herein is meant to include both the condensation products of acetophenone and the condensation products of acetophenone with a lower aliphatic aldehyde, such as formaldehyde.

Although the thermoplastic polyketone resins can be employed in the adhesive compositions of this invention in the aforementioned proportions, preferred embodiments comprise per 100 parts of epihalohydrin polymer, 30 to 120 parts of the condensation product of an aliphatic or monoaryl alkyl ketone, and 30 to 100 parts of the condensation products of aliphatic, monoaryl alkyl and carbocyclic ketones with lower aliphatic aldehydes.

Optional minor additives can be added to the adhesive compositions of this invention, in amounts which do not materially adversely effect their use as oil and aliphatic solvent resistant pressure-sensitive adhesives. Exemplary additives include high temperature stabilizers and antioxidants; fillers such as hydrated silica, talc, alumina, antimony oxide, etc.; plasticizers such as N- ethyltoluene sulfonamide; flame retardant agents such as tris 2,3-dibromopropyl phosphate, etc. However, it is a feature of these compositions that additives are not necessary to produce the desired properties.

In the preparation of pressure-sensitive adhesive tapes, the compositions of this invention are applied to appropriate self-supporting flexible backings by conventional techniques such as casting, transfer coating, calendering, etc. Suitable flexible backings include polyester films, e.g., polyethylene terephthalate and tensilized polyethylene terephthalate; polyvinyl chloride films; polyvinyl fluoride films; polyvinylidene chloride films; polyimide films, e.g. those made from the polycondensation of an aromatic tetrabasic acid and an aromatic diamine; polyvinylidene fluoride films; aluminum foil; cloth; laminates of the aforementioned films with cloth; glass cloth; non-woven materials; paper; strand-reinforced paper; etc. If desired, an adhesive priming coat may be applied to the flexible backing prior to coating with the pressure-sensitive adhesive composition, but this is not essential to the preparation of excellent adhesive tapes.

In the following examples, a POLYKEN Probe Tack Tester was used in determining the probe tack. This apparatus, which is fully described in U.S. Pat. 3,214,971, consists of four functional parts: (1) a 304 stainless steel cylindrical probe, 0.50 cm. in diameter, machined at one end at 90° to the longitudinal axis, and finished to a surface roughness of 10 to 20 micro inches rms; attached to the compression loaded spring of (2) a series L Hunter Mechanical Force Gage (Hunter Spring Company, Brochure 750/FG, revised February 1961), (3) an annulus having an opening slightly larger than the diameter of the probe and (4) a carrier for the annulus which moves down to bring the annulus around the probe and then up to remove the annulus therefrom. The procedure described in the aforementioned '971 patent was followed, employing a carrier speed of 1 cm/sec; a contact time of one second and a loading of 100 gms/cm$^2$.

The peel adhesion values are the forces required to remove an adhesive tape from a stainless steel surface after contact therewith for 2 minutes at a temperature of about 75°F. The tape was stripped from the surface at a 180° angle using a crosshead speed of 12 inches per minute according to ASTM Test Method D-1000.

Rolling ball tack was determined by securing a piece of the adhesive tape, adhesive side up, to a horizontal surface. A steel ball one-half inch in diameter is placed on a track, inclined 30° to the horizontal test surface; the distance in inches along the inclined plane is the first reported value. The ball is released, and allowed to roll to a stop on the adhesive. The distance in inches traveled on the adhesive is reported as the second measurement.

Solvent resistance was determined following the procedure described in ASTM Test Method D-1000, Shear Strength after Solvent Immersion, Adhesive to Adhesive, without curing of the adhesive bond.

EXAMPLE 1

An epichlorohydrin-ethylene oxide copolymer elastomer (Hydrin 200, marketed by B. F. Goodrich Chemical Co.) was milled for about 3 minutes on a two-roll mill, each roll having a length of 12 inches and a diameter of 6 inches, with the rolls turning at differential speeds. Fifty grams of milled elastomer, 15.0 g. of Polyketone Resin ZKRA–0252 ( a resin marketed by Union Carbide Corp., which infrared analysis indicates is an acetophenone resin) and 240.0 g. of methyl ethyl ketone were weighed into a 1 quart friction lid can which was sealed and placed on a rolling mill for 3 days. The resulting composition was smooth in texture, viscous, and cream in color. It was spread onto a 2.2 mil thick polyethylene terephthalate film and dried at about 85°C for about 4 minutes. The dried pressure-sensitive adhesive layer was 1.4 mils thick. The physical and chemical properties of the adhesive tape are set forth in table.

EXAMPLES 2–4

In Examples 2–4 the procedure and ingredients of Example 1 were employed, varying only the amount of Polyketone Resin ZKRA–0252. Utilizing 25.0, 35.0 and 50.0 grams respectively of the resin, tapes having a dry adhesive thickness of 1.4, 2.1 and 2.0 mils were prepared. The properties of the pressure-sensitive adhesive tapes are reported in the table.

EXAMPLE 5

Following the procedure of the previous examples, an adhesive composition was prepared from 50.0 g. of Hydrin 200 elastomer and 35.0 g. of Polyketone Resin ZKMA–0251, a resin marketed by Union Carbide Corp., which evidence indicates is a methyl ethyl ketone-formaldehyde resin, in 240.0 g. of methyl ethyl ketone. After spreading and drying on 2.2 mil thick polyethylene terephthalate film, a dry adhesive thickness of 1.9 mils was measured. The properties of the pressure-sensitive adhesive tape are given in the table.

EXAMPLE 6

A polyepichlorohydrin elastomer (Hydrin 100, marketed by B. F. Goodrich Chemical Co.) was milled employing the procedure for milling Hydrin 200 given in Example 1. Following the preparation technique of the preceding examples, an adhesive composition was prepared from 50 g. of milled elastomer and 25 g. of Polyketone Resin ZKRA–0252 in 240.0 g. of methyl ethyl ketone. After spreading and drying on 2.2 mil polyethylene terephthalate film, a dry adhesive thickness of 1.8 mils was measured. The properties of the pressure-sensitive adhesive tape are reported in the table.

EXAMPLES 7–8

Following the procedure of the previous examples, adhesive compositions were prepared from 50.0 g. of milled Hydrin 200 and different amounts of cyclohexanone-formaldehyde resin (Polyketone A, marketed by BASF Corp.) in 240.0 g. of methyl ethyl ketone. Twenty grams of resin were used in Example 7 and 35.0 g. in Example 8. After spreading and drying as in Examples 1–6, adhesive thicknesses of 1.8 mils and 1.9 mils respectively were measured. The properties of the adhesive tapes are listed in the table.

EXAMPLE 9

Five hundred grams of Hydrin 200 elastomer was milled as in Example 1 but employing mill roll temperatures of 200° to 220°F. The amount of 0.5 g. of polymerized trimethyl dihydroquinoline (Agerite Resin D, sold by R. T. Vanderbilt Co.) was added as a high temperature stabilizer and antioxidant. Then 350.0 g. of Polyketone Resin ZKRA-0252 was added slowly, with mixing, to the milled elastomer, over a period of about 15 minutes. The resulting adhesive composition was heated on the mill to about 300°–330°F and melt applied following the procedure described in U.S. Pat. No. 2,879,547, onto the cloth side of a polyethylene cloth laminate to a thickness of 3.3 mils. The properties of the pressure-sensitive adhesive tape are reported in the table.

TABLE

| EXAMPLE | 1 | 2 | 3 | 4 | 5 | 6 | 7 | 8 | 9 |
|---|---|---|---|---|---|---|---|---|---|
| Adhesion to steel (oz./in.) | 8 | 52 | 61 | 101 | 102 | 46 | 68 | 96 | 80 |
| Probe Tack (gms.) | 135 | 388 | 443 | 680 | 720 | 110 | 413 | 360 | 467 |
| Rolling Ball Tack (in./in.) | 6/3.5 | 6/2.0 | 6/4.3 | 6/13 | 6/13 | 1/10 | 6/7.5 | 1/7.1 | 6/2 |
| Solvent Resistance (lbs./1/2 ins.) | | | | | | | | | |
| Xylene | 3.3 | 6.6 | 7.9 | 10.7 | 5.4 | 11.0 | 1.5 | 11.2 | |
| Wemco C | 15.7 | 14.7 | 14.9 | 17.1 | 13.6 | 22.2 | 5.0 | 18.0 | |
| Heptane | 14.6 | 11.2 | 6.9 | 18.6 | 13.0 | 20.7 | 4.9 | 17.4 | |

What is claimed is:

1. An adhesive tape comprising a flexible backing and supported thereon a pressure-sensitive adhesive consisting essentially of
   a. an elastomeric epihalohydrin polymer comprising recurring units having the formula

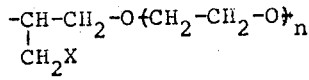

wherein X is chlorine or bromine and $n$ is zero to 2, and
   b. a thermoplastic polyketone resin comprising the condensation product of an aliphatic ketone having a total of 3 to 6 carbon atoms; a monoaryl alkyl ketone having from 6 to 10 ring carbon atoms in the aryl group and from 1 to 4 carbon atoms in the alkyl group; an aliphatic ketone having a total of 3 to 6 carbon atoms with a lower aliphate aldehyde; a monoaryl alkyl ketone having from 6 to 10 ring carbon atoms in the aryl group and from 1 to 4 carbon atoms in the alkyl group with a lower aliphatic aldehyde; or a carbocyclic ketone having 3 to 7 ring carbon atoms with a lower aliphatic aldehyde; said thermoplastic polyketone resin being present in an amount from about 30 to about 150 parts per 100 parts of said epihalohydrin polymer.

2. The adhesive tape of claim 1 wherein said thermoplastic polyketone resin is the condensation product of a phenyl alkyl ketone having 1 to 4 carbon atoms in the alkyl group; the condensation product of an aliphatic ketone having a total of 3 to 6 carbon atoms with a lower aliphatic aldehyde; the condensation product of a phenyl alkyl ketone having 1 to 4 carbon atoms in the alkyl group with a lower aliphatic aldehyde; or the condensation product of cyclohexanone with a lower aliphatic aldehyde.

3. The adhesive tape of claim 2 wherein said epihalohydrin polymer is a copolymer of epihalohydrin and ethylene oxide.

4. The adhesive tape of claim 3 wherein said thermoplastic polyketone resin is an acetophenone resin, and said resin is present in an amount from about 30 to about 120 parts per 100 parts of said epihalohydrin polymer.

5. The adhesive tape of claim 4 wherein said acetophenone resin is the condensation product of acetophenone with formaldehyde.

6. The adhesive tape of claim 3 wherein said thermoplastic polyketone resin is the condensation product of methyl ethyl ketone and formaldehyde, and said resin is present in an amount from about 30 to about 100 parts per 100 parts of said epihalohydrin polymer.

7. The adhesive tape of claim 3 wherein said thermoplastic polyketone resin is the condensation product of cyclohexanone and formaldehyde and said resin is present in an amount from about 30 to about 100 parts per 100 parts of said epihalohydrin polymer.

8. The adhesive tape of claim 2 wherein said epihalohydrin polymer is polyepichlorohydrin.

9. The adhesive tape of claim 8 wherein said thermoplastic polyketone resin is an acetophenone resin and said resin is present in an amount from about 30 to about 120 parts per 100 parts of said epihalohydrin polymer.

* * * * *